US012327216B2

(12) United States Patent
Joo et al.

(10) Patent No.: US 12,327,216 B2
(45) Date of Patent: Jun. 10, 2025

(54) COMPUTERIZED SYSTEMS AND METHODS FOR TRACKING UNDELIVERED RETURNED PARCELS

(71) Applicant: COUPANG CORP., Seoul (KR)

(72) Inventors: Hyunah Joo, Seoul (KR); Dayoung Kim, Gyeonggi-do (KR); Jihwan Kim, Gyeonggi-do (KR); Daeyong Jang, Gyeonggi-do (KR); Insung Kim, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 134 days.

(21) Appl. No.: 18/295,330

(22) Filed: Apr. 4, 2023

(65) Prior Publication Data
US 2024/0338649 A1 Oct. 10, 2024

(51) Int. Cl.
*G06Q 10/0837* (2023.01)
*G06Q 10/0833* (2023.01)
*G06Q 10/087* (2023.01)

(52) U.S. Cl.
CPC ..... *G06Q 10/0837* (2013.01); *G06Q 10/0833* (2013.01); *G06Q 10/087* (2013.01)

(58) Field of Classification Search
CPC .. G06Q 10/0837; G06Q 10/087; G06Q 20/32; G06Q 30/0641

(Continued)

(56) References Cited

U.S. PATENT DOCUMENTS 7,455,226 B1 * 11/2008 Hammond ........... G06Q 20/202 705/28
11,188,970 B1 * 11/2021 Xu ....................... G06Q 10/087

(Continued)

FOREIGN PATENT DOCUMENTS

CN 114202347 3/2022
KR 10-2002-0019736 A 3/2002

(Continued)

OTHER PUBLICATIONS

"Inventory Management in Reverse Logistics with Imperfect Production, Learning, Lost Sales, Subassemblies, and Price/quality Considerations" Published by Collections Canada (Year: 2009).*

(Continued)

*Primary Examiner* — Zeina Elchanti
(74) *Attorney, Agent, or Firm* — Finnegan, Henderson, Farabow, Garrett & Dunner LLP

(57) ABSTRACT

A computer system for processing undelivered returned products comprising a memory storing instructions for executing steps. The steps including receiving pallet information identifying a pallet as containing one or more undelivered returned products, creating at least one internal purchase order for the one or more undelivered returned products contained in the pallet and updating a product tracking database based on the at least one internal purchase order. A notice may be provided to a worker that an undelivered returned product has been returned and the return may be due to a customer cancelling an order. Further, based on receiving information from a worker that an undelivered returned product contains a defect, error information may be transmitted. Finally, based on receiving information that an undelivered returned product has moved to a stow zone, product availability information may be updated on a database.

18 Claims, 12 Drawing Sheets

(58) Field of Classification Search
USPC .......................................................... 705/340
See application file for complete search history.

(56) References Cited

U.S. PATENT DOCUMENTS

| | | | |
|---|---|---|---|
| 2017/0364860 A1* | 12/2017 | Wilkinson | G06Q 30/0255 |
| 2018/0144301 A1 | 5/2018 | Engel et al. | |
| 2021/0406811 A1 | 12/2021 | Kang et al. | |
| 2022/0245569 A1 | 8/2022 | Cho et al. | |

FOREIGN PATENT DOCUMENTS

| KR | 10-2021-0101180 A | 8/2021 |
|---|---|---|
| TW | 202221595 | 6/2022 |
| TW | 202234308 | 9/2022 |
| WO | WO 2020-183394 A1 | 9/2020 |

OTHER PUBLICATIONS

Office Action and translation for counterpart Taiwanese Patent Application No. 112116201 from the Taiwan Intellectual Property Office. (22 pages).
Taiwanese Office Action dated Aug. 15, 2024, for counterpart application No. 112116201 (15 pgs).
PCT International Search Report ("ISR") and Written Opinion issued by the Application Division of the Korean Intellectual Property Office ("KIPO") date of mailing Dec. 22, 2023, for corresponding International Application No. PCT/IB2023/054897.
Examination Notice dated Jan. 25, 2024 in corresponding application No. R.O.C. Patent Application No. 112116201 (13 pages).

* cited by examiner login  Sign Up  Service center

Category | Cheese | ? | 🛒

My Orders  Shopping Cart all 'Cheese' (65,586)        Gift Cards filter

☐ Fast Delivery
☐ Imported Product 65,586 results for 'Cheese'
Related searches: Sliced cheese  baby cheese  cheddar cheese  string cheese  butter  pizza cheese  cream cheese  cheese stick  cubed cheese  parmesan cheese 6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more FREE Shipping
Sliced cheese, 18g,
100 pieces
(88 won per 10 g)
Morning (Thursday)
(1294)

Mozzarella cheese,
1 kg, 2 pieces
🚀
(103 won per 10 g)
Tommorrow (Wed)
(285)

100 grams of cheddar
sliced cheese,
18 grams, 100 pieces
(73 won per 10 g)
Morning (Thursday)
(852)

Grated Parmesan
Cheese, 85g, 1 piece
🚀
(389 won per 10g)
Tomorrow (Wed)
(839)

Mozzarella cheese,
1 kg, 1
(85 won per 10g)
Morning (Thursday)
(379)

FREE Shipping
1.36 kg of string
cheese
Morning (Thursday)
(337)

*FIG. 1B*

COMPUTERIZED SYSTEMS AND METHODS FOR TRACKING UNDELIVERED RETURNED PARCELS

TECHNICAL FIELD

The present disclosure generally relates to computerized systems and methods for processing undelivered returned products. In particular, embodiments of the present disclosure relate to inventive and unconventional systems related to tracking an undelivered returned product. The tracking is performed by updating a product tracking database using information received through workers at different locations through various computer systems.

BACKGROUND

Sometimes a customer places a product order but then cancels the order prior to receiving the product. These undelivered returned products are typically in better condition than delivered returned products, which are often opened and used prior to return. However, typically these undelivered returned products are processed in the same manner and using the same computer system and designation as delivered returned products. All returned products are received at a single return center and both the undelivered and delivered returned products undergo the same quality assurance evaluation to determine if they are in good condition to be made available to customers again.

The inability of existing computer systems to track undelivered returned products separately from delivered returned products, requires limited and crowded return centers to waste space on sorting items that are likely in good condition. The space constraints lead to congestion in processing of all returned products, making it take longer to evaluate the returned products and make them available. Alternatively, companies may undertake costly expansions of their return centers to accommodate the large number of returned products.

Further, using existing computer systems which do not separately identify undelivered returned products from delivered returned products, workers have no means of identifying which returned products are undelivered. This technical problem also leads to workers wasting time performing a full quality assurance evaluation on a product that is likely in good condition. This unnecessary evaluation adds labor costs and delays the time until the products can be made available to customers again.

Therefore, there is a need for improved methods and systems for tracking undelivered returned products.

SUMMARY

One aspect of the present disclosure is directed to a system. The system may include a system for processing undelivered returned products. The system may include memory storing instructions and at least one processor configured to execute the instructions to receive pallet information identifying a pallet as containing one or more undelivered returned products; create at least one internal purchase order for the one or more undelivered returned products contained in the pallet; update a product tracking database based on the at least one internal purchase order; provide notice to a worker that an undelivered returned product of the one or more undelivered return products has been returned, the return being due to a customer cancelling an order; based on receiving information from a worker that an undelivered returned product of the one or more undelivered returned products contains a defect, transmit error information; and based on receiving information that an undelivered returned product of the one or more undelivered returned products has moved to a stow zone, update product availability information on a database.

Another aspect of the present disclosure is directed to a method for processing undelivered returned products. The method may include receiving pallet information identifying a pallet as containing one or more undelivered returned products; creating at least one internal purchase order for the one or more undelivered returned products contained in the pallet; updating a product tracking database based on the at least one internal purchase order; providing notice to a worker that an undelivered returned product of the one or more undelivered return products has been returned, the return being due to a customer cancelling an order; based on receiving information from a worker that an undelivered returned product of the one or more undelivered returned products contains a defect, transmitting error information; and based on receiving information that an undelivered returned product of the one or more undelivered returned products has moved to a stow zone, update product availability information on a database.

Yet another aspect of the present disclosure is directed to a system for processing undelivered returned products. The system may include memory storing instructions and at least one processor configured to execute the instructions to receive pallet information from a device of a worker identifying a pallet as containing one or more undelivered returned products; create at least one internal purchase order for the one or more undelivered returned products contained in the pallet; update a product tracking database based on the at least one internal purchase order; provide notice to a second worker on a second device that an undelivered returned product of the one or more undelivered return products has been returned, the return being due to a customer cancelling an order; based on receiving information from the second device that an undelivered returned product of the one or more undelivered returned products contains a defect, transmit error information; and based on receiving information that an undelivered returned product of the one or more undelivered returned products has moved to a stow zone, update product availability information on a database and modify a webpage to indicate to a customer that the undelivered returned product in the stow zone is available for purchase.

Other systems, methods, and computer-readable media are also discussed herein.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

DETAILED DESCRIPTION

Figure 1A:
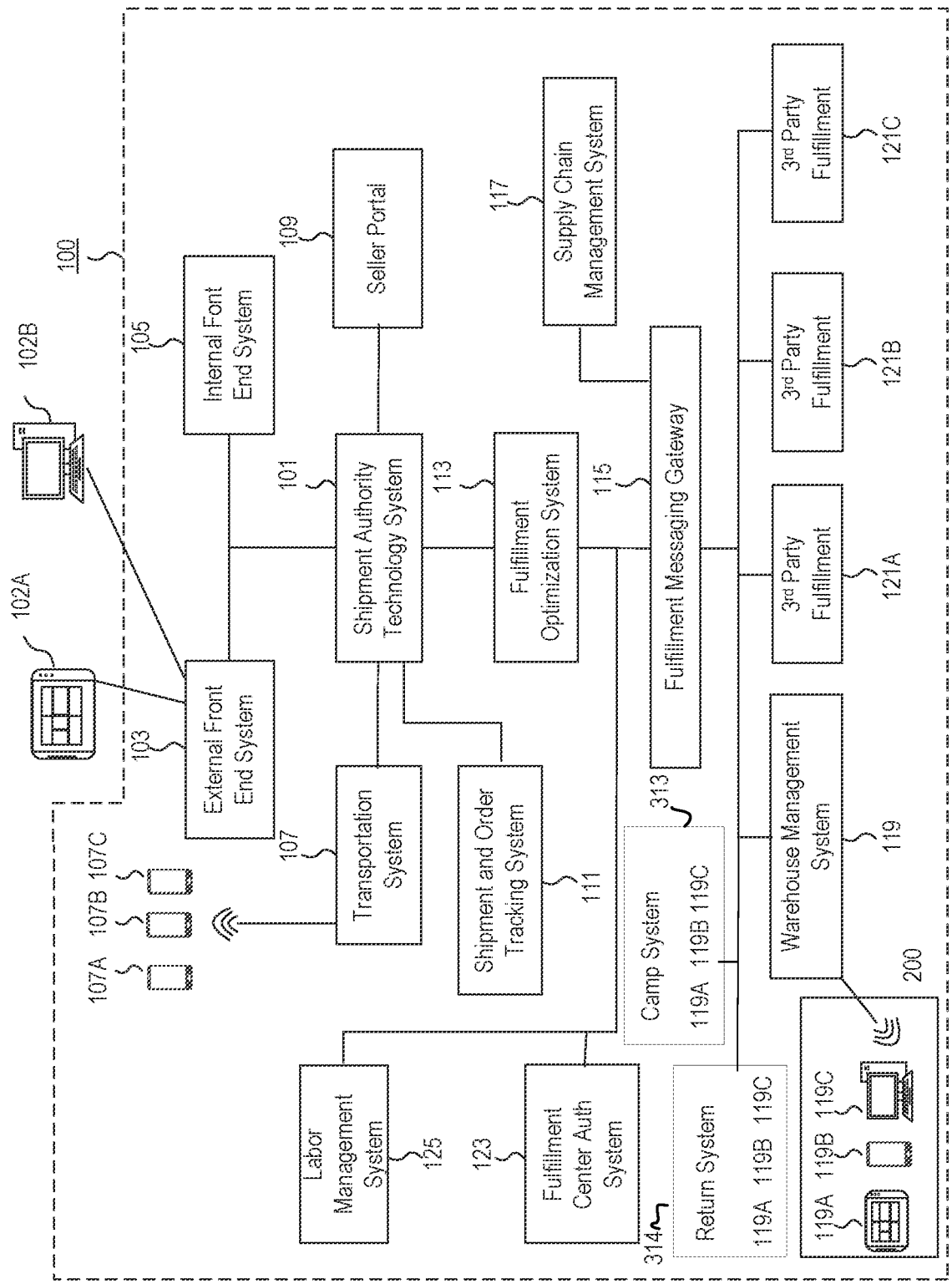
FIG. 1A is a schematic block diagram illustrating an exemplary embodiment of a network comprising computerized systems for communications enabling shipping, transportation, and logistics operations, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for processing undelivered returned products.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, camp system 313 in communication with devices (e.g., 119A, 119B, and 119C), return system 314 in communication with devices (e.g., 119A, 119B, and 119C), and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In some embodiments, external front end system 103 may further include an order return or cancellation system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders. In some embodiments, external front end system 103 may be further configured to allow the user at the user device to check information regarding PDD after placing the order and to cancel an existing order. For example, a user at a user device (e.g., mobile devices 107A-107C) may click on or otherwise interact with a user interface element (e.g., a button that reads "Cancel Order") to initiate order cancellation prior to receiving the ordered product.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
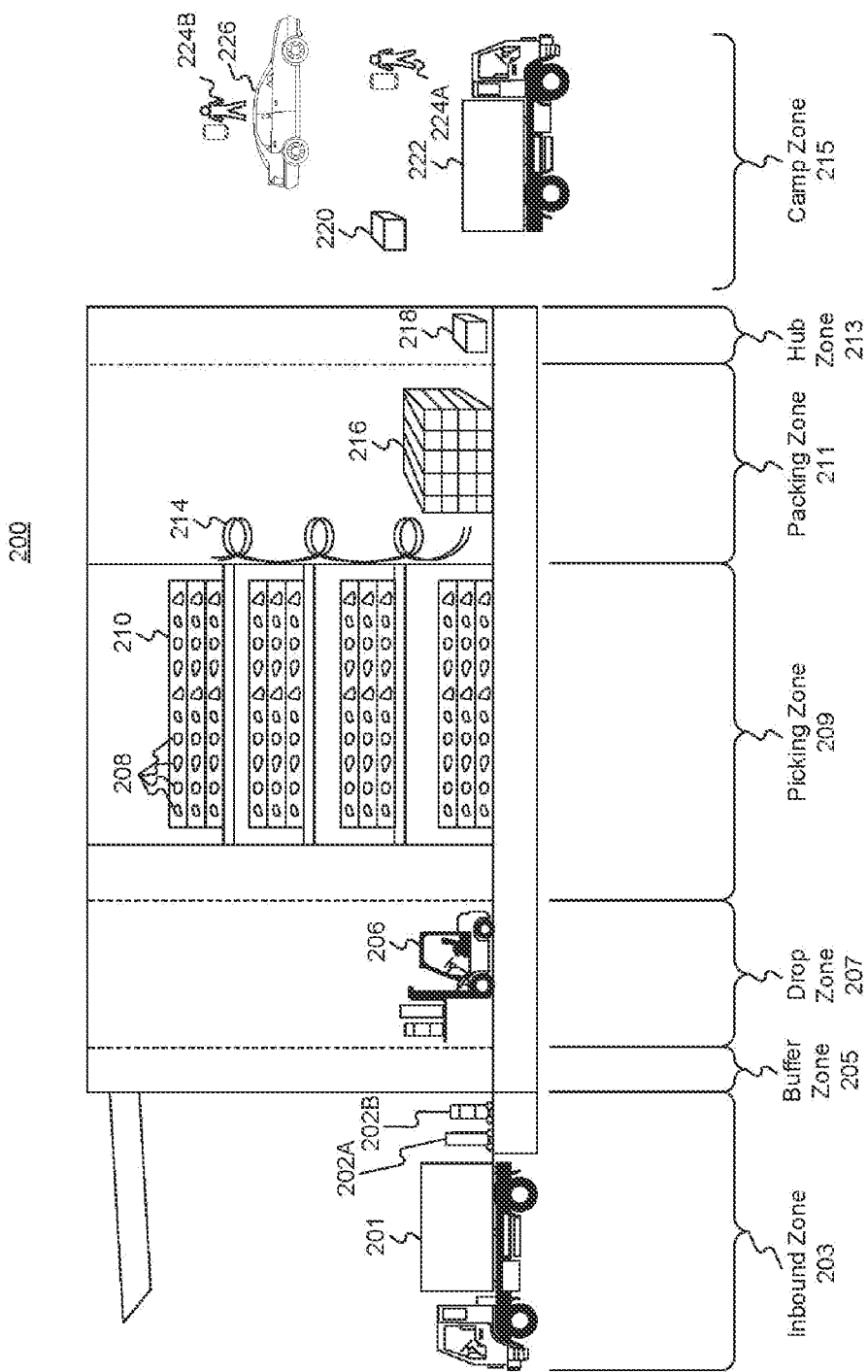
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
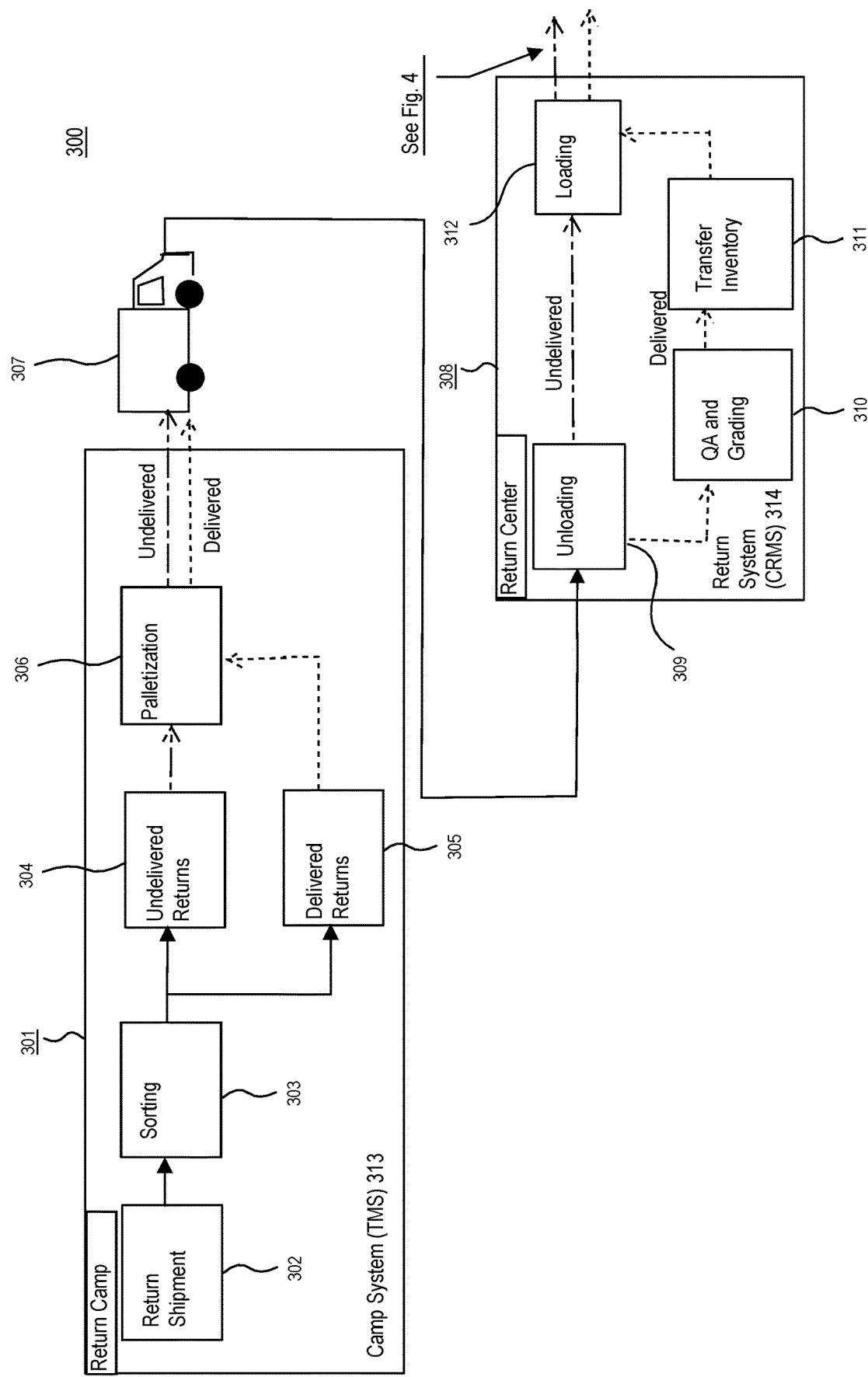
FIG. 3 is a diagrammatic illustration of processing undelivered products and delivered returned products at the return camp and at the return center (ARC), consistent with the disclosed embodiments.

FIG. 3 depicts a schematic diagram 300 illustrating the processing of a return shipment containing undelivered returned products (i.e., non-delivered returns) and delivered returned products at return camp 301 and at the return center (ARC) 308. A user may (e.g., using mobile device 102A or computer 102B) request to cancel an earlier completed order. In some embodiments, a user may interact with an interface on mobile device 102A or computer 102B to navigate to a webpage hosted by external front end system 103 to request cancellation of an earlier completed order. Following cancellation of the order, external front end system 103 may alert other systems, e.g. SAT system 101 or transportation system 107, of the cancelled order. The undelivered return product is then brought to a return camp 301. Return camp 301, in some embodiments, may comprise one or more buildings, one or more physical spaces, or one or more areas, where returned packages may be received. In some embodiments return camp 301 may be physically separate from return center 308, while in other embodiments return camp 301 may form part of return center 308.

Workers at return camp 301 (e.g., using one of devices 119A-119C) may process the return shipments 302 using camp system (Transport Management System "TMS") 313. In some embodiments, a worker may be a driver and may use camp system (TMS) 313 to determine whether a product they picked up is an undelivered returned product. At 303, a worker may sort the undelivered returned products 304 from the delivered returned products 305 and may place them onto separate pallets 306. In some embodiments, these pallets may be loaded together onto vehicle 307 (e.g. a truck) and brought to the return center 308. In other embodiments, undelivered returned products may be loaded onto a vehicle 307 different from the vehicle used to transport delivered return products, and the vehicle 307 may transport the undelivered returned products to the return center 308 or directly to the fulfillment center 200. Camp system (TMS) 313, in some embodiments, may be implemented as a computer system that receives information from one or more mobile devices 119A-119C, provides information to mobile devices 119A-119C, and transmits received information to other systems, as discussed further herein, for example, in reference to FIGS. 5-7.

Figure 4:
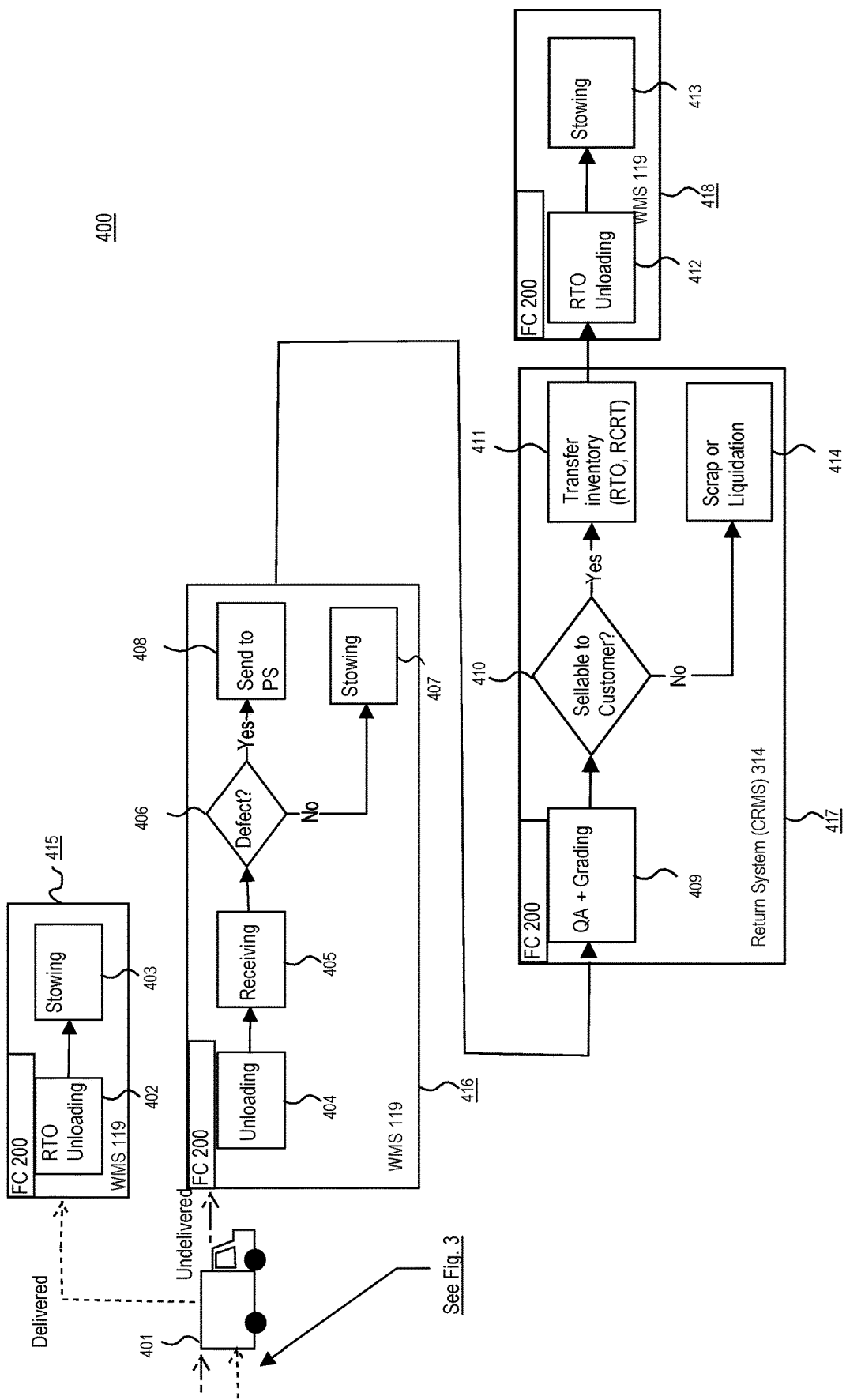
FIG. 4 is a diagrammatic illustration of processing undelivered products and delivered returned products at the fulfillment center, consistent with the disclosed embodiments.

Workers at return center 308 (e.g., using one of devices 119A-119C) may process the return shipments using return system (Customer Return Management System "CRMS") 314 at unloading area 309. The pallets of delivered returned products may be separated from the pallets of undelivered returned products and subjected to a thorough quality assurance and grading evaluation at 310 to determine if they are resellable. Based on evaluating a product's condition (e.g., examining packaging, looking for damage of the product, and/or ensuring all components are included), a worker may give a grade to the product (e.g., like new, high, medium, or low). Return system (CRMS) 314 may provide an interface on a worker device (e.g. 119A-119C) to allow the worker to provide information on the quality of the delivered returned products, to input the grade, and/or to note any deficiencies. After passing the quality assurance evaluation, delivered returned products are transferred at 311 and loaded for transport to the fulfillment center 200 at 312. Meanwhile, undelivered returned products may skip this thorough quality assurance evaluation and may be directly loaded for transport to the fulfillment center 200 at 312. In some embodiments, undelivered returned products and delivered returned products may be loaded together onto vehicle 401 (e.g. a truck), as shown in FIG. 4, and brought to the fulfillment center 200. In other embodiments, undelivered returned products may be loaded onto a different vehicles 401 from the delivered returned products. Return system (CRMS) 314, in some embodiments, may be implemented as a computer system that receives and processes information on transferred pallets, stores and/or transmits this information to other systems, and provides an interface for processing returned products, as discussed further below in reference to FIGS. 5-7.

FIG. 4 depicts a schematic diagram 400 illustrating the processing of undelivered returned products and delivered returned products at the fulfillment center 200. The workers at fulfillment center 200 (e.g., using one of devices 119A-119C) may unload and receive the undelivered returned products using WMS 119. In some embodiments, both delivered returned products and undelivered returned products are unloaded at the same area of the fulfillment center. In other embodiments, vehicle 401 may bring the delivered returned products to an unloading area different from an unloading area of undelivered returned products, e.g., to area 415. In some embodiments, the unloading area for the delivered and/or undelivered returned products may be the same as the inbound zone 203 where sellers deliver their products, as depicted in FIG. 2. At unloading zone 415, delivered returned products are unloaded at 402 and moved directly to stowing at 403. Meanwhile, at unloading and receiving zone 416, the undelivered returned products are unloaded at 404 and received at 405. WMS 119 can notify the worker (e.g., using one of devices 119A-119C) that the unloaded product is an undelivered returned product (as opposed to a newly ordered product) requiring a quick determination of whether the product is defective. A worker can make a determination at 406 as to whether the product is defective. Defective undelivered returned products are moved to problem solving zone 417 at 408 and non-defective undelivered returned products are moved to stowing at 407. As described above, WMS 119 may be implemented as a computer system that monitors workflow based on receiving information from devices (e.g., devices 119A-119C). The WMS 119 may further generate, store, and transmit information on undelivered returned products to other systems and provide an interface for processing undelivered returned products, as discussed further herein, for example, in reference to FIGS. 5-7.

At problem solving zone 417, workers at 409 (e.g., using one of devices 119A-119C) may perform a quality assurance and grading evaluation using return system (CRMS) 314 to determine if the defective undelivered returned product is sellable. Based on evaluating a product's condition, a worker will give a grade to the product (e.g., like new, high, medium, or low). Return system (CRMS) 314 may provide an interface on a worker device (e.g. 119A-119C) to allow the worker to provide information on the quality of the undelivered returned products, to input the grade, and/or to note any deficiencies, as discussed further herein, for example, in reference to FIG. 7. If the defective undelivered returned product is determined to be sellable at 410, a return transfer order (RTO) is created and the product is transferred at 411 (using, e.g., a dolly, a handtruck, a forklift, real cart ("RCRT"), and/or by other means) to an RTO unloading and stowing zone 418. At RTO unloading and stowing zone 418, the sellable undelivered returned product is unloaded at 412 and stowed at 413. If the defective undelivered returned product is determined to not be sellable, it is moved to scrap or liquidation at 414. As described above, return system (CRMS) 314, may be implemented as a computer system that receives information on transferred pallets, stores and/or transmits this information to other systems, and provides an interface for processing and evaluating returned products.

As shown above, in some embodiments, undelivered returned products are processed separately from delivered returned products. Unlike the delivered returned products, in some embodiments, the undelivered returned products may not undergo the full quality assurance evaluation at the return center 308. Instead, they can undergo a quick review at the fulfillment center and are subject to a more thorough evaluation only on detecting a defect. Return centers 308 may be more limited in number and crowded than fulfillment centers 200. Therefore, avoiding a thorough evaluation of the undelivered returned product at the return center can save space and avoid crowding, allowing all products to be made available to customers more quickly. It also may reduce the number of return centers needed to efficiently process the returns and may avoid unnecessary and costly expansion of return center capacity.

Figure 5:
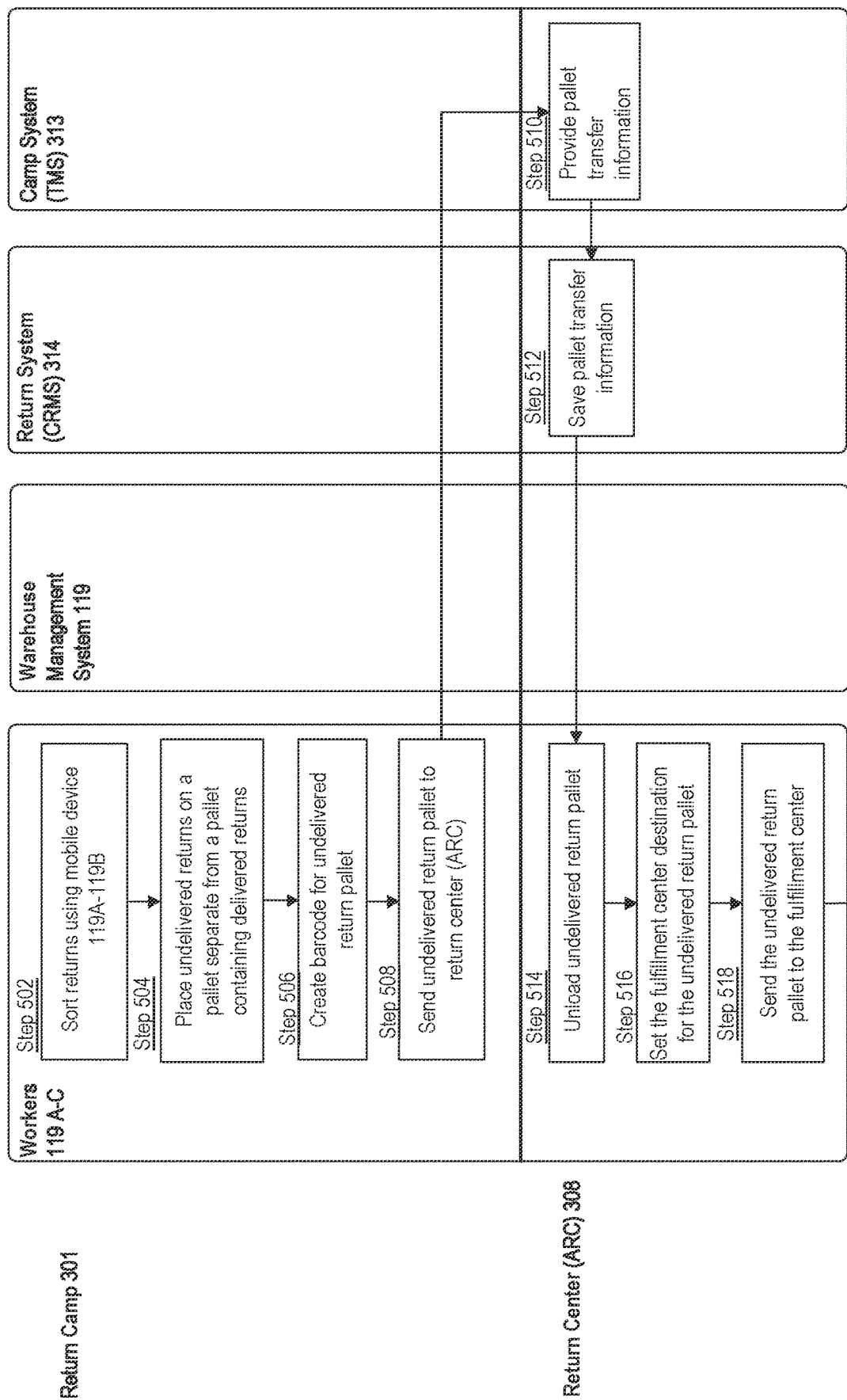
FIG. 5 depicts a process for tracking an undelivered returned product at the return camp and at the return center (ARC), consistent with the disclosed embodiments.

FIG. 5 depicts a process for tracking an undelivered returned product at the return camp 301 and at the return center (ARC) 308. First, at Step 502, a worker at return camp 301 may sort undelivered returned products from delivered return products. In some embodiments, a worker is aided in determining whether products are delivered returns or undelivered returns by a mobile device (e.g. mobile devices 119A-119C) and/or a variety of systems in computer system 100, e.g. Camp System (TMS) 313. In some embodiments, a worker may be a driver that determines whether the products are delivered returns or undelivered returns. In some embodiments, a worker may input an identifier of a product manually or the worker may scan or otherwise capture data associated with an identifier of the product (e.g., a barcode, an image, a text string, an RFID tag, or the like) using, for example, a worker's mobile device (e.g., 119A-119C). In some embodiments, the undelivered returned product may arrive at the return camp in a container (i.e. parcel) and/or box and an identifier of the product may be outside of the container and/or box. In some embodiments, the undelivered returned product may arrive at the return camp loose, which may be the form that it was sold. In some embodiments, the product identifier may provide information on multiple products, while in other embodiments the product identifier may provide information on a single product. Based on receiving the inputted product identifier, a system, e.g. Camp System (TMS) 313, may provide information indicating whether the product is a delivered returned product or undelivered returned product. For example, this information may be provided to Camp System (TMS) 313 by SAT 101 based on information received from external front end system 103. In some embodiments, a system (e.g., Camp System (TMS) 313) and/or mobile device (e.g., 119A-C) can notify a worker that a product is an undelivered returned product through a mobile device (e.g. 119A-119C) by changing a display color, flashing a light, presenting a notification, playing a sound, creating a vibration, or through any other means of alerting the worker.

At step 504, a mobile device (e.g., 119A-C) and/or a system in computer system 100 instructs the worker to place the undelivered returned products on a pallet separate from delivered returned products. In some embodiments, the instruction may be provided in form of text and/or numbers describing a pallet location, providing directions to the pallet, and/or providing a pallet identification. In some embodiments, these instructions may be spoken to the worker. In some embodiments, a worker may input an identifier of a pallet manually or the worker may scan or otherwise capture data associated with an identifier of the pallet (e.g., a barcode, an image, a text string, an RFID tag, or the like) using a mobile device (e.g., 119A-119C). Based on receiving the inputted pallet identifier, the mobile device (e.g., 119A-C) may indicate whether the pallet is intended to store delivered returned products or undelivered returned products. In some embodiments, a worker may place a box and/or container containing multiple undelivered returned products onto a pallet. In other embodiments, the undelivered returned products may be placed in pallets in loose form without a box and/or container.

At step 506, a mobile device (e.g., 119A-C) and/or a system in computer system 100 instructs the worker to create a barcode for the pallet of undelivered returned products. In some embodiments, this instruction may include a button, and/or link which when clicked causes an interface to be rendered (e.g., on device mobile device 119A-119C) to aid the worker in completion of the barcode. The worker (e.g., using mobile device 119A-119C) may create a barcode for the undelivered returned products pallet. The barcode may include information identifying the pallet as one containing undelivered returned products, identifying each product within the pallet, providing transfer information and/or may include other information that allows for product transfer and tracking.

At step 508, a mobile device (e.g., 119A-C) and/or a system in computer system 100 instructs the worker to load the undelivered returned products onto a vehicle 307 to be sent to the return center 308. In some embodiments, the instruction may be provided in form of text and/or numbers describing a location of a vehicle to be loaded, providing directions to the vehicle, and/or providing the vehicle identification. As part of the loading and sending process, the worker may enter information regarding the pallet manually and/or through scanning the created pallet barcode (e.g., using mobile device 119A-119C). Mobile device (e.g. 119A-119C) may transmit this inputted information to camp system (TMS) 313. In some embodiments, the inputted information includes a pallet barcode and/or return invoice information which may be contained in the barcode and which may include a return invoice number, information identifying that the pallet contains undelivered return products, an identity of each product within the pallet, a quantity of products, a quantity of products of a particular type, a detailed description of the products, transfer details and/or other information allowing for product transfer.

At step 510, the camp system (TMS) 313 receives this inputted information and stores it in a database and/or transmits the information to return system (CRMS) 314.

At step 512, return system 314 receives the transmitted information regarding the undelivered returned products pallet from the camp system 313 and/or from a mobile device (e.g., 119A-C). Return system 314 stores the received information in a database and/or transmits the information to another system in computer system 100.

At step 514, a device (e.g., 119A-C) and/or a system in computer system 100 instructs a worker to unload the pallet. In some embodiments, this instruction may be provided in the form of text and/or numbers describing an unloading location, providing directions to the unloading location, and/or providing an unloading location identification. The worker may use a device (e.g., mobile devices 119A-119C) to scan the undelivered returned products pallet barcode which may provide return invoice information, and which may identify the pallet as containing undelivered returned products and provide other information on the pallet. In some embodiments, the information provided by the device (e.g., mobile devices 119A-119C) may include an identification of a loading zone 312 to take the products, information on a fulfillment center, and/or information on a stow destination.

Based on this information, at step 516, a worker may select a fulfillment center 200 as the destination for the pallet on an interface of a device (e.g., device 119A-119C). In some embodiments, the worker may further designate where in the fulfillment center 200 the undelivered returned products pallet should be delivered to allow for unloading. In some embodiments, this information may be sent to a system in computer system 100 and the system receiving the information may store it in a database for future access by a worker (e.g. a vehicle driver) using a mobile device (e.g., 119A-119C). In some embodiments, this information may be sent directly to a mobile device (e.g. mobile device 119A-119C of the driver).

At step 518, the undelivered returned products pallet bypasses the quality assurance evaluation performed on delivered returned products and is sent to the destination fulfillment center 200 and/or the designated unloading area within the fulfillment center 200. As part of the loading and sending process, a worker at the return center 308 may input information on the undelivered returned pallet (e.g., using device 112A-112C). In some embodiments this information may be input manually or a worker may scan the barcode created at step 506. In other embodiments, this information is input as part of the unloading performed in Step 514. The inputted information may include information identifying the pallet as one containing undelivered returned products, identifying each product within the pallet, identifying a quantity of products, identifying a quantity of products of a particular type, providing a detailed description of the products, providing transfer information and/or may include other information that allows for product transfer, tracking, and the creation of an internal purchase order. The device (e.g., 112A-112C) may transmit the inputted pallet information to return system 314.

Figure 6:
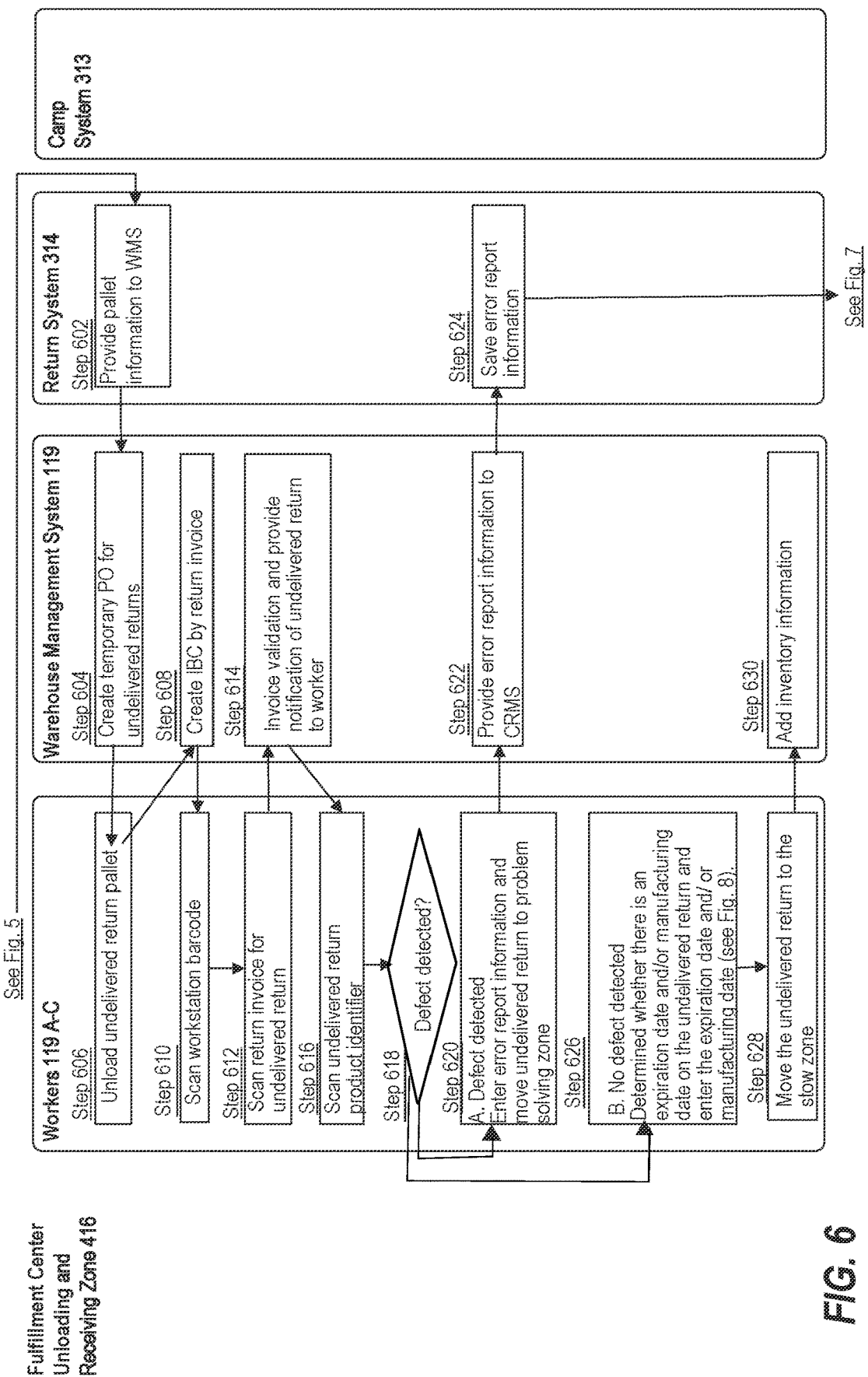
FIG. 6 depicts a process for tracking an undelivered returned product at the fulfillment center, consistent with the disclosed embodiments.

FIG. 6 depicts a process for tracking an undelivered returned product at the fulfillment center 200. At step 602, return system 314 may provide information on the undelivered returned products pallet to warehouse management system 119. In some embodiments, the information is the same as the pallet transfer information received in step 512, while in other embodiments this information is updated or replaced. In some embodiments, the return system 314 may provide a destination fulfillment center, a pallet barcode, a return invoice number, a SKU barcode and/or a quantity of the one or more undelivered returned products to the warehouse management system 119.

At step 604, the warehouse management system 119 creates a temporary purchase order for the undelivered returned products based on the information provided in Step 602. In some embodiments, the temporary purchase order may mimic an actual purchase order typically received for newly ordered products. For example, the temporary purchase order may be formatted in exactly the same manner as a standard purchase order but may include a flag that a product is an "undelivered return" so that the warehouse management system 119 and the worker can distinguish it from a standard purchase order. A flag can be in the form of a text (e.g., "undelivered return" may be noted as the ordering type), symbols, and/or values that allow the temporary purchase order to be distinguished. The temporary purchase order allows the undelivered returned products to be processed by the warehouse management system 119 without requiring the creation of a new order. The temporary purchase order may provide details on a single product, a package of products, a pallet of products, and/or a truck load of products. In some embodiments, the temporary purchase order may include information on order history, which may include an external ordering number, a purchase order number, an ordering type (e.g. undelivered return, new order etc.), company name, order status, order date, transportation type, expected receive date and time, number of SKU types, order quantity, rejection quantity, receive quantity, stow quantity and/or stowing error quantity. In some embodiments, the temporary purchase order may further include inbound booking details, which may include a booking ID, booking number, booking time, total unit quantity, box quantity, pallet quantity, truck number, and/or status. In some embodiments, the temporary purchase order may further include information on the unloading history, which may include unloading number (IBC) barcode, unloading type, booking number, invoice number, unload date, pallet quantity, box quantity, unloading operator, and/or unloading type. In some embodiments, the temporary purchase order may include product information including a product identifier (e.g. a SKU ID), an external SKU ID, a SKU barcode, a product name, a status, a quantity of products (which may include a quantity of products ordered, returned, received, stowed, and/or with a stowing error), a product type, an expiration date, a manufacturing date, a year produced, and a return invoice number. In one embodiment, some of the purchase order information may be fake to allow for processing of the undelivered returned products. For example, a fake order date may be included in the purchase order to allow for processing.

At Step 606, a worker at the fulfillment center unloading and receiving zone 416 may unload the undelivered returned products pallet. The worker may use a device (e.g., mobile devices 119A-119C) to scan the purchase order and/or a barcode on the undelivered returned products pallet. The device may then identify the pallet (e.g., on a screen of the device) as containing undelivered returned products and provide other information on the undelivered returned products. The warehouse management system 119 may create a new entry to track the undelivered returned product in a product tracking database. This entry in the product tracking database may include a product identifier, an indication of the product as an undelivered returned product, a time, date, workflow location within the fulfillment center 200, user identifier, and/or other information included in the temporary purchase order. In some embodiments, the entry workflow location may be updated to reflect the location of the undelivered returned product in the unloading and receiving zone 416. In other embodiments, the entry workflow location may be updated to reflect a location of the undelivered returned product in an unloading zone, separate from a receiving zone. In some embodiments, a worker may remove the undelivered returned product from a box and/or container for transport to a receiving zone (e.g. via a dolly, a handtruck, a forklift, or manually), while in other embodiments the undelivered returned product remains in the box and/or container for transport.

In step 608, the warehouse management system 119 may create a return invoice and/or an inbound barcode (IBC) containing return invoice information to process the undelivered returned products. This return invoice and/or IBC may be based on information manually entered by a worker or may be generated based on other information stored in warehouse management system 119 (including, e.g., temporary purchase order information) and/or received from return system 314.

At step 610, the undelivered returned product may be moved to a receiving zone where a worker is located at a workstation (e.g., a table, desk, counter, bench etc.) processing products. The worker may scan the workstation barcode associate with their workstation in the receiving zone (e.g., using device 119A-119C). In some embodiments, the workstation barcode may be located on a wall, desk, aisle or piece of equipment. In some embodiments, a worker may manually input the identity of the workstation. In some embodiments, mobile device (e.g., 119A-119C) may send information on the workstation identity to the warehouse management system 119.

At step 612, the worker may scan the undelivered returned product return invoice and/or an inbound barcode (IBC) (e.g. using device 119A-119C). In some embodiments, device (e.g., 119A-119C) may send information on the undelivered product return invoice to the warehouse management system 119. Warehouse management system 119 may update the product tracking database based on receiving information on the workstation identification and the undelivered return product invoice. In some embodiments, the product tracking database workflow location for the undelivered returned product may be updated to reflect a location in the receiving zone or at the particular workstation identified.

Further, at step 614 the warehouse management system 119 may validate the return invoice and/or workstation identity. For example, warehouse management system 119 may confirm that a return invoice number, product identifier, description, quantity, or status matches the information in the product tracking database and/or information included in the temporary purchase order. For example, warehouse management system 119 may include (e.g., in the product tracking database) a purchase order which includes identifier information for multiple products. The warehouse management system 119 may confirm that the identity of a product (or products) provided by a return invoice and/or an inbound barcode (IBC) matches an identifier in a selected temporary purchase order. Warehouse management system 119 may provide an interface on a worker device (e.g., devices 119A-119C) for further processing the product. In some embodiments, the interface may include a picture of the product and a notice to the worker that the product is an "undelivered return" which alerts the worker to decide whether the product is defective. The interface may also display a workstation identifier and a return invoice identifier based on information in the product tracking database. Furthermore, the interface may prompt a worker to confirm certain items about the product. For example, a worker may need to confirm that the undelivered returned product arrived at the correct workstation. The interface may further prompt a worker to scan a product identifier.

At step 616, the worker may manually input or scan the product identifier for the undelivered returned product (e.g., using device 119A-119C). In some embodiments, a worker may remove the undelivered returned product from a box and/or container in order to scan the product identifier. The product identifier may be attached to the product or may be located near the product, for example on the created return invoice or purchase order. The product identifier may comprise one or more of an item barcode, a stocking keeping unit (SKU), an RFID tag, a matrix barcode, such as Quick Response (QR) code, or the like.

At step 618, the worker may visually inspect the undelivered returned product to determine whether there is a defect and an error report needs to be submitted. In some embodiments, the worker may need to remove the undelivered returned product from a box and/or container to perform the inspection. The warehouse management system 119 may provide on the interface of a device (e.g., 119A-119C) an ability to enter error report information. In some embodiments, the worker may select a button to enter error information and, in response, WMS 119 may provide one or more selectable pre-determined options describing the error. In other embodiments, these options are automatically provided on the main interface display without selection of a button.

In some embodiments, the warehouse management system 119 provides these pre-determined options in response to determining the status of a product as an "undelivered returned product". In some embodiments, these options include: a mismatch between a product name and the image, product is surplus, product was damaged after receipt, product was damaged on arrival, an error in the return invoice, an error in the barcode, an error in an expiration date or a date of manufacturing, the product is unable to be made resellable, or any other options. In some embodiments, upon a worker selecting a button to enter error report information, the interface will display the pre-determined options and an option indicating that the product is unable to be made resellable may be pre-selected for confirmation by the worker.

If a defect is determined, at step 620, the worker may enter error report information using the interface described above. The error report may include a reason for the error (e.g., one or more of the predetermined options), a return invoice identifier, a product identifier, a product quantity and/or a barcode associated with receiving error. In some embodiments, the device (119A-C) may send the error report information to the warehouse management system 119. Further, in some embodiments, a device (e.g., 119A-C) and/or a system in computer system 100 may instruct the worker to bring the product to the problem solving zone. In some embodiments, this instruction may be provided in the form of text and/or numbers describing a location of the problem solving zone, providing directions to the problem solving zone, and/or providing an identification of the problem solving zone.

At step 622, the warehouse management system 119 receives the error report information and stores it in a database and/or transmit the error report information to the return system 314. The defective undelivered returned product may be moved to the problem solving zone 417, further detailed below with reference to FIG. 7.

At step 624, the return system 314 receives the error report information and stores it in a database and/or transmits the information to other systems in computer system 100.

If no defect is determined, at step 626, a worker may determine whether there is an expiration date and/or manufacturing date on the undelivered returned product and may enter this information on an interface provided by warehouse management system 119 (e.g. an interface provided on mobile devices 119A-119C). The warehouse management system 119 may receive the date information and update the product tracking database and/or transmit the information to another system in computer system 100.

At step 628, a device (e.g., 119A-C) and/or a system in computer system 100 instructs the worker to move the undelivered returned product with no defects to a stow zone to be stored before delivery. In some embodiments the warehouse management system 119 may provide a worker with information (e.g., using device 119A-119C) on the stow zone location, aisle, and/or storage unit to stow the undelivered returned product. At the stow zone, a worker may use a device (e.g., mobile device 119A-119C) to scan a barcode before stowing the product. In some embodiments, the barcode may be located on a wall, aisle, or storage unit of the stow zone and may include or be associated with a location identifier. The device (e.g., 119A-119C) may send the stow zone barcode information to the warehouse management system 119.

At step 630, the warehouse management system 119 may update the workflow location in the product tracking database to reflect the location provided by the worker's device (e.g. mobile device 119A-119C). The warehouse management system 119 may update inventory information on a website to show the product as available to customers for purchase. In some embodiments, the warehouse management system 119 may update inventory information on external front end system 103 to reflect the product as available, allowing a customer to search for the stowed product, request information on the stowed product and/or initiate a purchase as described above.

Figure 7:
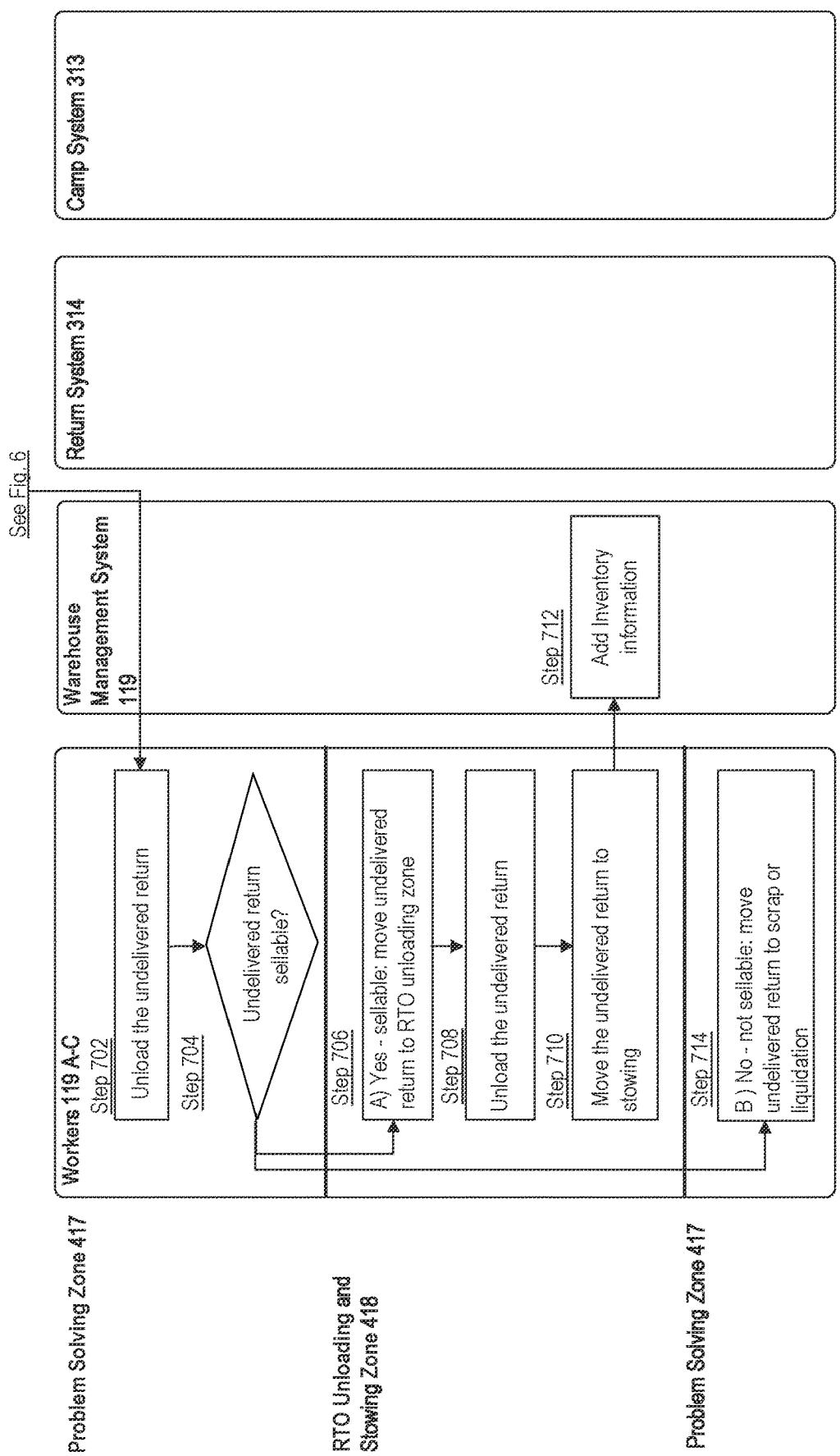
FIG. 7 depicts a process for tracking an undelivered returned product at the problem-solving zone of the fulfillment center, consistent with the disclosed embodiments.

FIG. 7 depicts a process for tracking an undelivered returned product at a problem-solving zone of the fulfillment center. A problem-solving zone of a fulfillment center 200 may be, for example, a set-aside physical area where products are examined. At step 702, a mobile device (e.g., 119A-C) and/or a system in computer system 100 instructs the worker to unload and inspect the defective undelivered returned product at the problem solving zone 417. In some embodiments, the worker may need to remove the undelivered returned product from a box and/or container to perform the inspection. In some embodiments, this instruction may be provided in the form of text and/or numbers describing a location of and/or directions to a product to be retrieved and unloaded. The worker may use a device (e.g., mobile devices 119A-119C) to scan a barcode associated with the undelivered returned product or may manually look up the product, for example in the return system 314.

At step 704, a device (e.g., 119A-C) and/or a system in computer system 100 instructs the worker to perform a quality assurance and grading review of the product to determine whether it is sellable. In some embodiments, a computer system 100, e.g., return system 314, may provide an interface (e.g., on device 119A-119C) including steps for evaluating the product. For example, the interface may provide a list of criteria to consider when determining whether the product is sellable.

If the product is determined to be sellable, then at step 706 a device (e.g., 119A-C) and/or a system in computer system 100 instructs the worker to move the product to the RTO unloading and stowing zone 418. In some embodiments, this instruction may be provided in the form of text and/or numbers describing a location of the unloading and stowing zone, providing directions to the unloading and stowing zone, and/or providing an identification of the unloading and stowing zone. In some embodiments, these instructions are to move the product to the unloading zone and later instructions are provided to move to the stowing zone. In some embodiments, a worker (using e.g., 119A-C) may create a return transfer order (RTO) to allow the items to be transferred and resold.

At the RTO unloading and stowing zone 418, at step 708, device (e.g., 119A-C) and/or a system in computer system 100 instructs the worker to unload the product. In some embodiments, this instruction may be provided in the form of text and/or numbers describing a location of the product to be unloaded, providing directions to the product, and/or providing the product identification.

After the product is unloaded, at step 710, a device (e.g., 119A-C) and/or a system in computer system 100 may instruct the worker to move the product to stowing. In some embodiments, this instruction may be provided in the form of text and/or numbers describing a location of the stow zone, providing directions to the stow zone, and/or providing the stow zone identification. At the stow zone, a worker may use a device (e.g., mobile device 119A-119C) to scan a barcode before stowing the product. In some embodiments, the barcode may be located on a wall, aisle, or storage unit of the stow zone and may include or be associated with a location identifier. The device (e.g., 119A-119C) may send the stow zone barcode information to the warehouse management system 119.

As described previously in reference to step 630, at step 712 the warehouse management system 119 may update the workflow location in the product tracking database, and may update a website (e.g. external front end system 103) to show the product as available, allowing a customer to search for the stowed product, request information on the stowed product and/or initiate a purchase.

If the product is determined to not be sellable, then at step 714 device (e.g., 119A-C) and/or a system in computer system 100 instructs the worker to move the product to scrap or liquidation. In some embodiments, this instruction may indicate how the product is to be processed (e.g., trash, recycle, or liquidation). In some embodiments, the instruction may be provided in form of text and/or numbers describing a disposal location and/or providing directions to the disposal location.

Figure 8:
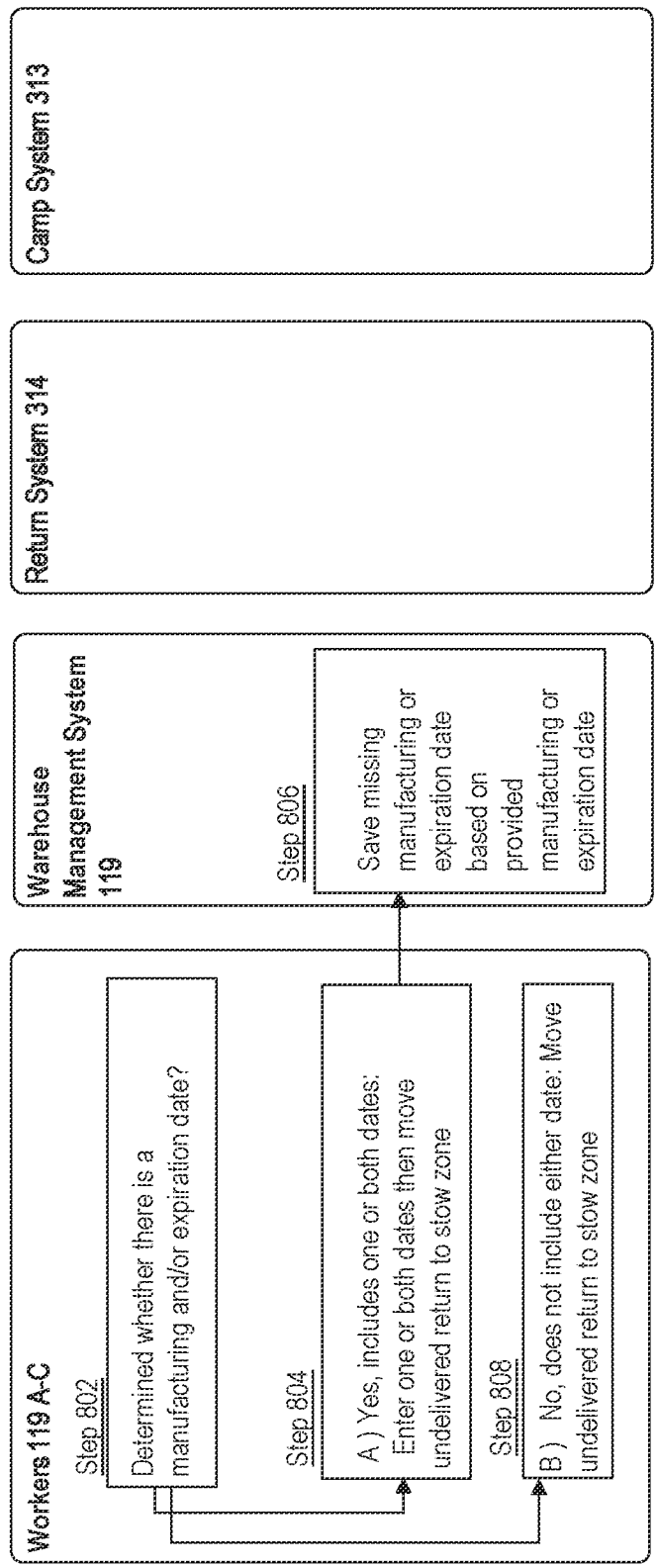
FIG. 8 depicts a process to save missing manufacturing date or expiration date information, consistent with the disclosed embodiments.

FIG. 8 further expands on FIG. 6 step 626 and details a process for determining manufacturing or expiration date information. When a product is shipped for delivery, the manufacturing and expiration date information may no longer be accessible in a system in computer system 100 or in an associated database. Therefore, for returned products, the information will need to be re-created prior to making the product available to customers again. At step 802, the device (e.g., 119A-119C) and/or a system in computer system 100 instructs a worker to determine whether the undelivered returned product has a manufacturing date and/or an expiration date. In some embodiments, the device (e.g., 119A-119C) may highlight an area of an interface to enter the manufacturing date and/or expiration date information.

If the product has a manufacturing date and/or an expiration date, at step 804 a worker may enter one or both of these dates on an interface provided by warehouse management system 119 on a worker's device (e.g., devices 119A-119C). For example, WMS 119 may provide on a device (e.g., 119A-119C) a means of entering this information through a text box, a drop down menu of months/day/years, and/or a calendar with selectable dates.

At step 806, warehouse management system 119 will save the entered manufacturing date and/or an expiration date. If the worker only enters one of the expiration date and manufacturing date, the warehouse management system 119 may generate the other of the expiration date and manufacturing date. The warehouse management system 119 may do this by gathering information on the expected life of the product. In some embodiments, the warehouse management system 119 may gather this information from the product tracking database or through communicating with the external front end system 103. The expiration date may be calculated by adding the expected life of the product to the manufacturing date. The manufacturing date may be calculated by subtracting the expected life of the product from its expiration date. At step 806, the warehouse management system 119 may store the expiration date and manufacturing date in the product tracking database and/or may transmit the information to a website (e.g. external front end system 103), allowing the customer to view these dates. For example, a customer may view the expiration date and manufacturing date on a Search Result Page shown in FIG. 1B and/or a Single Detail Page (SDP) shown in FIG. 1C. Further, a device (e.g., 119A-C) and/or a system in computer system 100 may instruct the product to be moved to stow, as detailed above with reference to step 628.

If the product does not have a manufacturing date or an expiration date, at step 808, a device (e.g., 119A-C) and/or a system in computer system 100 may instruct the product to be moved to stow, as detailed above with reference to step 628.

As described above, during the processing of an undelivered returned product, a product tracking database may be updated based on receiving information from workers at various locations using different mobile devices (e.g., 119A-119C). The product tracking database may include a product identifier, an indication of the product as an undelivered returned product, a time, date, workflow location within the fulfillment center 200, user identifier, and/or other information. In some embodiments, the product tracking database is available to any worker at return camp 301, return center 308, and/or fulfillment center 200. The warehouse management system 119 may provide product tracking information on an interface of a worker device (e.g., on mobile device 115A-115C) and may allow the worker to search and filter product tracking information based on any of the tracked criteria. For example, a worker may be able to filter for the information on returned products having a status as "undelivered" separately from returned products having a status as "delivered".

As shown above, disclosed computer systems (e.g., warehouse management system 119) allow the undelivered returned products to be processed separately from the delivered returned products. To allow this separate processing, the above computer systems provide for product tracking while interfacing with different users at various locations through different computer systems. Based on the separate tracking, the computer systems may provide information on a worker's device that allows them to process the undelivered returned product more efficiently. Therefore, the speed in which an undelivered returned product is available to a customer may be increased. Finally, based on the separate tracking of the undelivered returned product, the computer system may automatically update a webpage, quickly allowing the product to be available for re-purchase.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for processing undelivered returned products, the system comprising:
   a memory storing instructions; and
   at least one processor configured to execute the instructions to:
      receive pallet information identifying a pallet as containing one or more undelivered returned products;
      create at least one internal purchase order for the one or more undelivered returned products contained in the pallet;
      update a product tracking database based on the at least one internal purchase order;
      provide notice to a worker that an undelivered returned product of the one or more undelivered return products has been returned, the return being due to a customer cancelling an order;
      based on receiving information from a worker that an undelivered returned product of the one or more undelivered returned products contains a defect, transmit error information; and
      based on receiving information that an undelivered returned product of the one or more undelivered returned products has moved to a stow zone,
         automatically update product availability information on a database; and
         modify a webpage to indicate to a customer that the undelivered returned product is available for purchase.

2. The computer-implemented system of claim 1, wherein an undelivered returned product is a product that is associated with an earlier completed order associated with a customer, the product not having been received by the customer before the customer executed an order cancellation function.

3. The computer-implemented system of claim 1, wherein the at least one internal purchase order is based on the received pallet information.

4. The computer-implemented system of claim 1, wherein the received pallet information includes at least one of: a destination fulfillment center, a pallet barcode, a return invoice number, a SKU barcode or a quantity of the one or more undelivered returned products.

5. The computer-implemented system of claim 1, wherein the instructions further comprise: send instructions to a worker's device to present information on the one or more undelivered returned products from the updated product tracking database.

6. The computer-implemented system of claim 5, wherein the instructions further comprise: send instructions to the worker's device to provide on the user interface an ability for the worker to filter for the information on the one or more undelivered returned products separately from information on other products.

7. The computer-implemented system of claim 1, wherein the instructions further comprise receiving from a worker one of an expiration date or a manufacturing date of an undelivered returned product of the one or more undelivered returned products and generating the other of an expiration date or a manufacturing date.

8. The computer-implemented system of claim 1, wherein the instructions further comprise: prompt a worker to provide one or more reasons why an undelivered returned product of the one or more undelivered returned products is defective.

9. The computer-implemented system of claim 8, wherein the prompt allows a worker to select multiple reasons for why an undelivered returned product of the one or more undelivered returned products is defective.

10. A computer-implemented method for processing undelivered returned products, the method comprising:
    receiving pallet information identifying a pallet as containing one or more undelivered returned products;
    creating at least one internal purchase order for the one or more undelivered returned products contained in the pallet;
    updating a product tracking database based on the at least one internal purchase order;
    providing notice to a worker that an undelivered returned product of the one or more undelivered return products has been returned, the return being due to a customer cancelling an order;
    based on receiving information from a worker that an undelivered returned product of the one or more undelivered returned products contains a defect, transmitting error information; and
    based on receiving information that an undelivered returned product of the one or more undelivered returned products has moved to a stow zone,
        automatically update product availability information on a database; and
        modify a webpage to indicate to a customer that the undelivered returned product is available for purchase.

11. The computer-implemented method of claim 10, wherein an undelivered returned product is associated with an earlier completed order associated with a customer, the product not having been received by the customer before the customer executed an order cancellation function.

12. The computer-implemented method of claim 10, wherein the at least one internal purchase order is based on the received pallet information.

13. The computer-implemented method of claim 10, wherein the received pallet information includes at least one of: a destination fulfillment center, a pallet barcode, a return invoice number, a SKU barcode or a quantity of the one or more undelivered returned products.

14. The computer-implemented method of claim 10, wherein the method further comprises: send instructions to a worker's device to present information on the one or more undelivered returned products from the updated product tracking database.

15. The computer-implemented method of claim 14, wherein the method further comprises: send instructions to the worker's device to provide on the user interface an ability for the worker to filter for the information on the one or more undelivered returned products separately from information on other products.

16. The computer-implemented method of claim 10, wherein the method further comprises: receiving from a worker one of an expiration date or a manufacturing date of an undelivered returned product of the one or more undelivered returned products and generating the other of an expiration date or a manufacturing date.

17. The computer-implemented method of claim 10, wherein the method further comprises:
    prompting a worker to provide one or more reasons why an undelivered returned product of the one or more undelivered returned products is defective; and
    wherein the prompt allows a worker to select multiple reasons for why an undelivered returned product of the one or more undelivered returned products is defective.

18. A computer-implemented system for processing undelivered returned products, comprising:
    a memory storing instructions; and
    at least one processor configured to execute the instructions to:
        receive pallet information from a device of a worker identifying a pallet as containing one or more undelivered returned products;
        create at least one internal purchase order for the one or more undelivered returned products contained in the pallet;
        update a product tracking database based on the at least one internal purchase order;
        provide notice to a second worker on a second device that an undelivered returned product of the one or more undelivered return products has been returned, the return being due to a customer cancelling an order;
        based on receiving information from the second device that an undelivered returned product of the one or more undelivered returned products contains a defect, transmit error information; and
        based on receiving information that an undelivered returned product of the one or more undelivered returned products has moved to a stow zone,
            automatically update product availability information on a database; and
            modify a webpage to indicate to a customer that the undelivered returned product in the stow zone is available for purchase.

* * * * *